INVENTORS
FRANCIS E. ELWOOD
GORDON C. SCHAUB

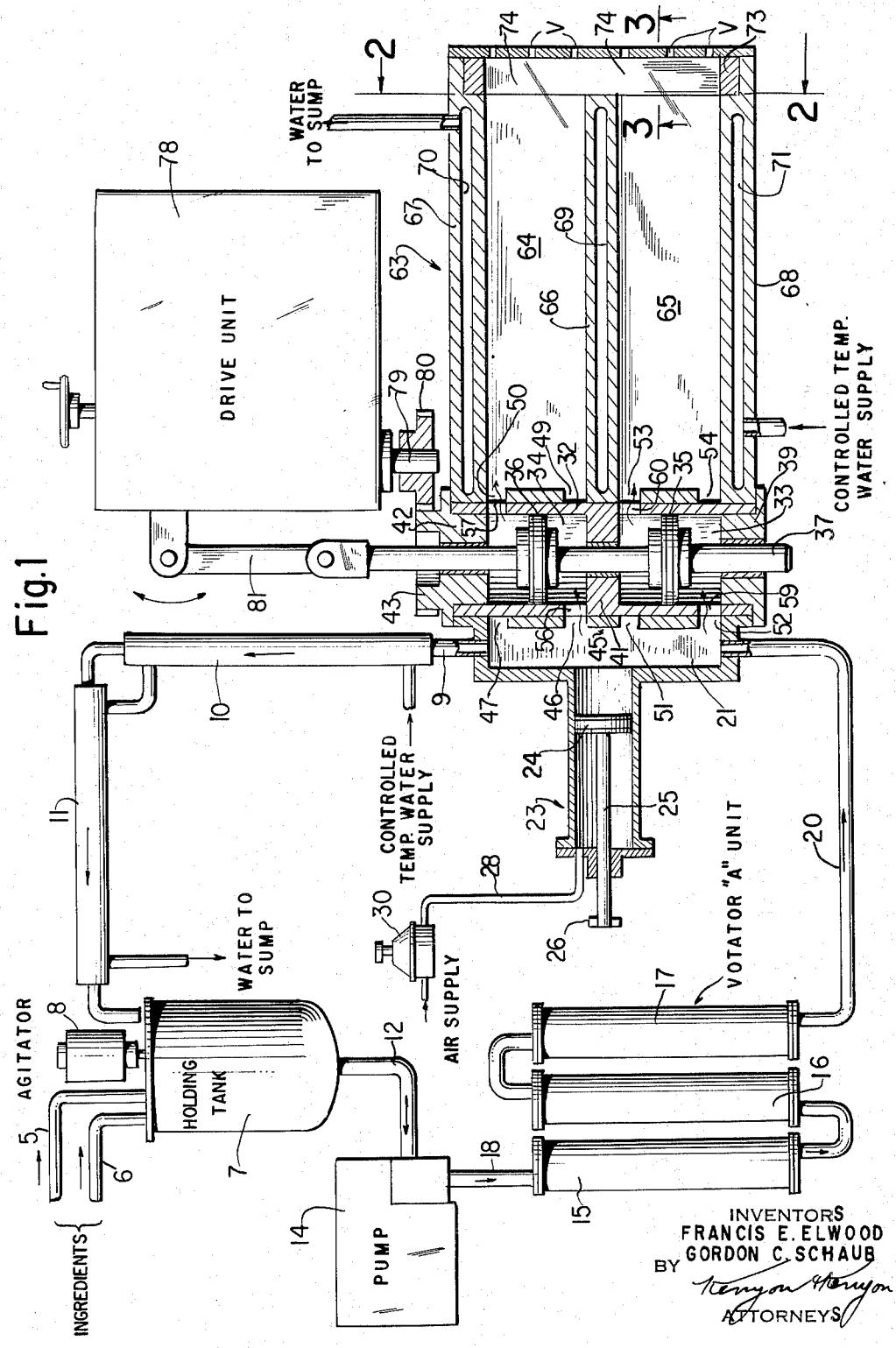

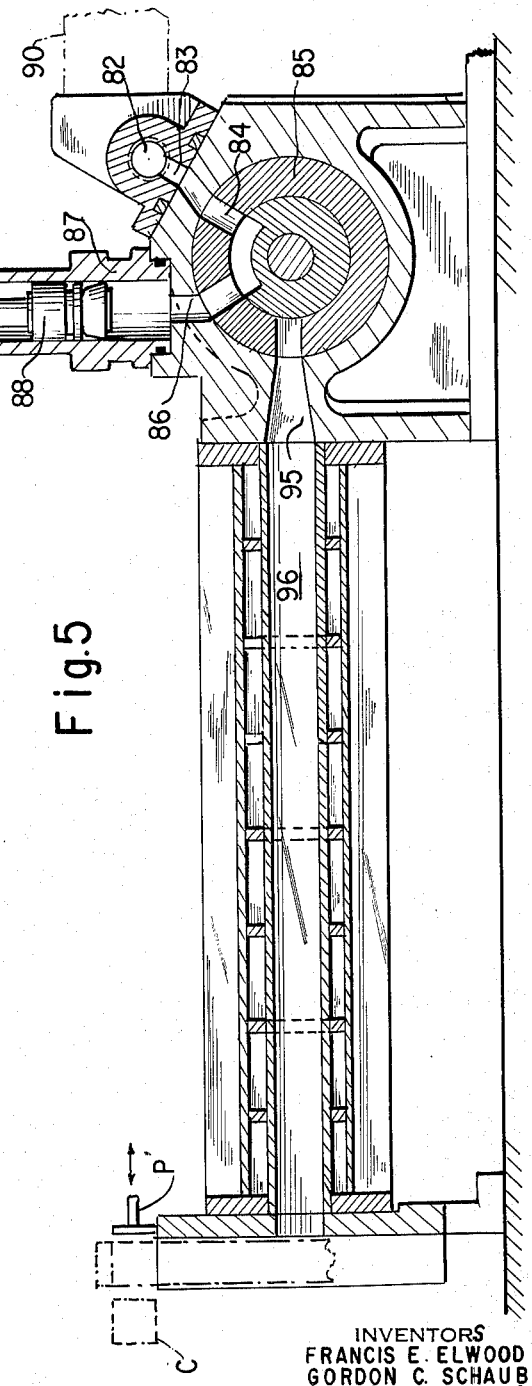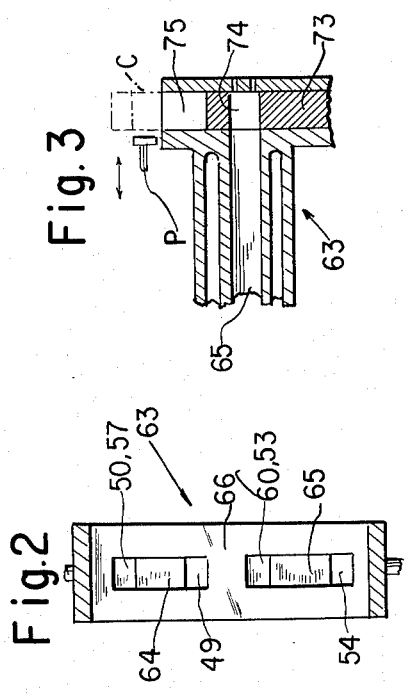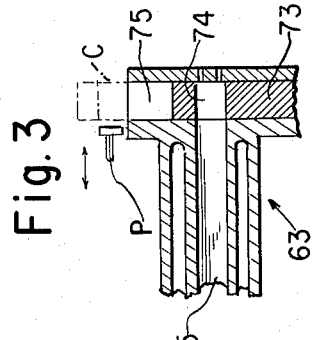

3,217,632
APPARATUS FOR MANUFACTURING MARGARINE
Francis E. Elwood, Mountainside, and Gordon C. Schaub, Westfield, N.J., assignors to Corn Products Company, New York, N.Y., a corporation of New Jersey
Filed Jan. 19, 1962, Ser. No. 167,313
5 Claims. (Cl. 99—244)

This application is a continuation-in-part application of our copending application Ser. No. 790,882, filed February 3, 1959 (now abandoned).

This invention relates to a system for producing margarine having exceptional characteristics from the standpoint of texture, stand-up quality at ambient temperature and the manner in which it strips from a wrapper.

In conventional systems for manufacturing margarine, the liquid product flowing from the Votator units is first solidified, then worked in the solidified state to achieve homogeneity and finally packaged as a block or print weighing approximately one-quarter pound. In the operation, the solid margarine is extruded from an orifice having the desired cross-section of the final print and cut to length before wrapping. The problems in designing machinery for such an operation center principally on handling a shapeless solidified mass of margarine for an appreciable period of time.

In the course of investigating the factors responsible for the defects in conventional margarine, it was discovered unexpectedly that working solidified margarine after the time it is first solidified is undesirable. The less work imparted to solidified margarine the better the final product in regard to the characteristics mentioned hereinabove. However, in examining conventional practices, it was found that little use could be made of conventional equipment to the advantage of this finding, consequently it was necessary to devise new apparatus without the benefit of previous experience.

In the development of the apparatus of this application, the utlimate goal was to design a plant which would allow the molds to be filled directly from a single Votator unit instead of requiring that the margarine emulsion be passed first into a quiescent zone such as that of a second Votator unit and from there to the screw unit of the molding machine.

Our initial attempt was to place a hollow chamber followed by the tapered front end of a screw unit directly in front of a conventional Morpac unit. The chamber unfortunately constituted a zone of accumulation due to the large volume of emulsion which was constantly setting up in it. In view of the solidification of the margarine in the chamber, it became necessary to maintain a very high pressure in the chamber in order to move the mass toward the tapered end of the unit. In order to operate this unit, pressures on the order of 200 p.s.i.g. were necessary. The margarine products produced with this apparatus were totally unsatisfactory and were even more inferior than the margarine produced by the conventional Morpac process. The unsuitability of the margarine was due to the working which resulted from forcing the margarine through the tapered neck of the screw units and from the working which resulted from a channeling of the margarine as it was being forced through the chamber by high pressure.

In the next attempt, the tapered end of the screw unit was removed and in place thereof we substituted a short dual chamber approximately 5½″ long. Each chamber had a total channel length of approximately 9″, the final 3½″ of each chamber being straight and having the same cross-sectional dimensions as the margarine print. This apparatus was an improvement over the previous apparatus because substantially lower pressures could be employed although the print was still unsatisfactory due to the working which occurred in passing the margarine through the curved sections at the beginning of each dual chamber and to the channeling in the product which resulted from the product sticking to the walls of the chamber.

The next modification involved an attempt to heat the accumulation zone with live steam in order to reduce the pressure and reduce the channeling in the product. The product was superior to those previously produced, but still unsatisfactory due to it being forced through the curved portions of the first 5½″ of each chamber and because the channeling problem was not completely solved.

At this point, it became evident that this type of accumulation zone was not practical because of the pressure induced on the system and the disfiguration of the print that resulted. Therefore, the next unit as embodied in this application, consisted of metered pistons feeding liquid margarine emulsion directly into a straight chamber with the cross-sectional area of the print. The unit was surrounded by a warm water jacket in order to reduce channeling. The product obtained using this unit was vastly superior to any of the products previously obtained since working of the product had been eliminated by providing a molding zone of the same cross-sectional area as the print and by jacketing of the molding zone with a heat exchanger. Furthermore, using this apparatus we were able to take a margarine emulsion directly from the first Votator unit and pass it directly to the molding zone.

Accordingly, an object of this invention is to provide an apparatus and a system for processing margarine by which little or no work is done on the margarine after solidification.

Another object is to provide an apparatus and a system for handling a continuous supply of margarine by which the final wrapped product has excellent characteristics in regard to texture, stand-up qualities and the manner in which it is stripped from a wrapper.

Other objects and advantages will be apparent from the following description and explanation thereof.

The present invention will be understood by reference to the accompanying drawings, wherein:

FIGURE 1 is a specific embodiment of an illustrative apparatus and system of processing margarine including the feature of metering liquid margarine and providing for solidification of the metered amount thereof in the cross-sectional shape of the final print;

FIGURE 2 is a view taken along lines 2—2 in FIGURE 1;

FIGURE 3 is a view taken along lines 3—3 in FIGURE 1;

FIGURE 5 is a cross-sectional view taken along lines 5—5 of FIGURE 4.

Figure 4:
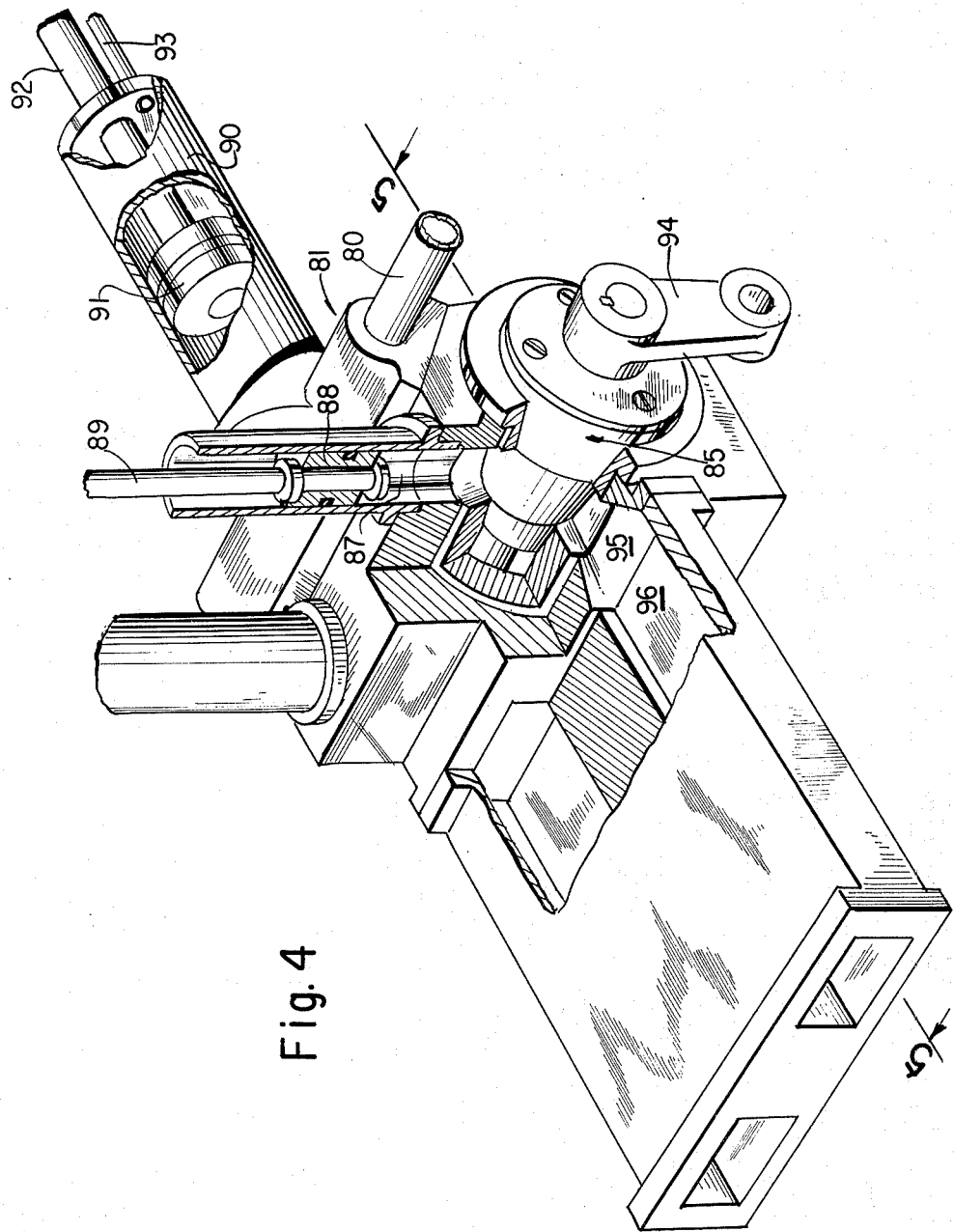
FIGURE 4 is an isometric view, partly in section, of another specific embodiment by which liquid margarine is first metered and then solidified into a block having the cross-section of the final print.

As shown in the drawings, particular reference being made to FIGURE 1, margarine fat and skimmed milk are fed from supply conduits 5 and 6, respectively, to a holding tank 7 wherein they are mixed thoroughly by means of an agitator 8. The holding tank also collects margarine which has been recycled from the metering system by means of a conduit 9. The recycle conduit 9 is heated with arm water indirectly by means of jackets 10 and 11 to assure liquefaction of the recycled margarine.

The mixture of margarine ingredients is discharged from the bottom of the holding tank 7 by means of a conduit 12, and thence charged to pump 14, which provides the necessary pressure for circulating the mixture through the Votator units 15, 16 and 17. The mixture is circulated from pump 14 to the Votator units through line 18. The treated liquid margarine leaves the last Votator unit through conduit 20 at a temperature which is sufficiently low so that in time it will solidify.

The liquid margarine flowing continuously under pressure from supply line 20 enters a box-like header 21, which is part of a connector between the supply source and a wrapping unit. The header 21 communicates with a compensating or surge cylinder 23 in which is positioned a surge piston 24. The surge piston 24 is maintained in a centrally aligned position within the cylinder through a piston rod 25, which has a stop 26 at its outer end. Air pressure is maintained on one side of piston 24 by means of a supply line 28 containing a pressure regulator 30. It will be noted that the supply of liquid margarine enters at one end of header 21 and the recycle conduit 9 is connected to the other end.

Adjacent the header 21 is a rotatable cylinder 32. The rotatable cylinder is separated by means of a wall 41 into two metering sections, 33 and 34, of similar construction. In the cylindrical sections 33 and 34 are situated double acting pistons 35 and 36, respectively, which are in turn supported on a single piston rod 37. One end of the cylinder 32 is sealed with a removable flanged head 39. The flanged head 39 also contains a longitudinal bore in which is supported the piston rod 37. Additional support of the piston rod 37 is provided by the longitudinal bore in the separating wall 41. The other end of the cylinder 32 is sealed with a head 42, which like the head 39, fits snugly within the cylinder 32, and in addition contains a gear 43 as an integral part thereof. The piston rod 37 is also supported within a longitudinal bore of the head 42 as in the case of the separating wall 41 and head 39. The bores are axially aligned for proper functioning of the piston rod 37.

A fixed sleeve valve 45 is mounted on the metering cylinder 32. For discussion purposes, the sleeve valve may be looked upon as consisting of an upper half and a lower half (orientation by drawing). The upper half of the sleeve valve 45 contains ports 46 and 47 on one side and ports 49 and 50 on the other side, in opposing relationship to one another. Similarly, the lower half of the sleeve valve 45 contains ports 51–54 inclusive. Referring to the metering section 34, it contains ports 56 and 57 which are shown in register with ports 46 and 50 of the sleeve valve. Although not shown, metering section 34 contains two more ports, which at an appropriate time in the rotation of metering cylinder 32, register with ports 46 and 47 of the sleeve valve 45. Similarly, metering section 33 contains ports 59 and 60 in register with ports 52 and 53 respectively, of the sleeve valve 45 and also two more ports (not shown) which register with ports 51 and 54 of the sleeve valve at a given period of rotation of the metering cylinder 32.

The metering cylinder 32 adjoins an elongated rectangular shaped molder 63 which is divided into two parts 64 and 65 to accommodate the separate flow of margarine from the metering sections 34 and 33, respectively. Wall 66 divides the molder 63 into parts 64 and 65. The molder 63 is bounded by outer walls 67 and 68, which are integral with the box header 21. The walls 66, 67 and 68 of the molder contain internal passages 69, 70 and 71, respectively, for the circulation of warm water.

The piston rod 37 is reciprocated by an arm 81 which is operated by suitable mechanical means shown as a driving unit 78. Another shaft 79 of the driving unit 78 carries a driving gear 80 which engages the gear 43 for continuous rotation of metering cylinder 32.

Referring to FIGURE 2 it is shown that the parts 64 and 65 of the molder 63 are longitudinal sections of rectangular cross-section. In FIGURE 3, the end of the molder 63 is adjacent to a die 73 containing a chamber 74 having air vents V which reciprocates in a plane transverse of the paper, with respect to FIGURE 1, or vertically with respect to FIGURE 3 in the passage 75 thereof. When the die-chamber 74 aligns with the part 65 of the molder, the solidified margarine is forced into it, and subsequenly cleaved to print size by the upward movement thereof.

In the operation of the system shown in FIGURES 1–3 inclusive, the margarine ingredients which have been charged to the holding tank 7 and mixed therein are further processed in the Votator units 15, 16 and 17. The liquid margarine flows into the box header 21 wherefrom it is charged to the metering sections 33 and 34. With reference to the metering section 33, liquid margarine enters the same below the piston 35 but at the same time, the margarine above the piston is being forced into the molder section 65. In the reverse action of the piston, liquid margarine enters the section through the aligned ports including port 51, whereas liquid margarine is forced from the metering cylinder below piston 35 to the molder 65 through the aligned ports including port 54. The compensating cylinder 23 serves as a surge capacity for margarine during those fractions of the cycle when a port to the metering cylinder is not open. If desired, the output of margarine from the Votator units can be recycled to the holding tank through line 9. Liquid margarine is processed through molder section 64 at the same time and in the same way as the operation described above with respect to molder section 65.

In the molder 63, the liquid margarine is held up long enough for substantial solidification to occur. At the end of the molder, the solidified margarine is forced into the die chamber 74, which in its upward travel cleaves the margarine to the final print size. The die 73 reciprocates vertically in unison with the timing of the metering cylinder so that, for example, for every quantity of margarine forced from the metering cylinder to the molder section 65, an equivalent quantity is cleaved by the die 73 at the end of the molder 63. This cleaved-off portion C in the die chamber 74 is pushed out of the latter by any suitable reciprocally movable pusher P when the chamber 74 of die 73 moves outwardly of the upper edge of the said end of molder 63. Reference may be had to U.S. Patent No. 3,033,689 for a more detailed description of the structure and operation of die 73 and pusher P which are conventional elements in margarine manufacture.

Referring to the embodiment shown in FIGURES 4 and 5, the principle of operation is the same as in the case of the apparatus shown in FIGURE 1–3 inclusive. The supply of liquid margarine is provided by conduit 80 which is fastened to connector 81. The connector 81 contains a header 82 having a transverse port 83. In FIGURE 5, the port 83 is in register with the port 84 of the two-way valve 85, which in turn is aligned with the port 86 leading to the metering cylinder 87. The metering cylinder contains a piston 88 which is fastened to a rod 89. The compensating or surge cylinder 90 communicates with the header 82, and it contains a piston 91 and a rod 92. Air is supplied to the cylinder above the piston by conduit 93.

The two-way valve is reciprocated by means of a rocker arm 94. The piston 89 of the metering cylinder 88 is likewise reciprocated by suitable mechanical means, not shown. In FIGURE 5, in one position of the two-way valve 85, the supply header 82 interconnects with the metering cylinder. In the second position, the port 84 of the valve interconnects the metering cylinder 87 with the port 95 leading to the longitudinal bore 96 of the molder. Actually there are two mold sections 96 each of which operates simultaneously and in the same way. The description of the processing of the margarine through the one also applies to the other. The design of the molder is similar to that described above in FIGURES 1–3.

The operation of the apparatus in FIGURES 4 and 5 is obvious from the drawings. Liquid margarine is charged continuously to the supply header 82. When the two-way valve aligns with the metering cylinder 87, margarine under pressure flows therein. In the meantime, as margarine flows into the metering cylinder, the piston 88 is travelling upwardly to provide capacity. When the piston 88 reaches the top of its travel, the two-way valve alternates it its second position, thus communicating the metering cylinder with the molder bore 96. At this point, the piston 88 is brought down and thus forces liquid margarine into the molder bore 96. The compensating cylinder 90 acts in the same way as described hereinabove.

Having thus provided a written description of our invention along with specific examples thereof, it should be understood that the same is defined by the appended claims.

What is claimed is:

1. An apparatus for providing molded units of solidified liquid product of prescribed shape comprising in combination supply means for solidfiable liquid material, a delivery connector communicating with said supply means, a straight substantially rectangular molder having a longitudinal bore of substantially uniform cross section throughout the entire length of said bore, the cross section of said bore governing the shape and texture of the desired final solidified product corresponding to that of the desired final solidified product, and adapted to receive solidifiable liquid material at one end to discharge solidified product at its other end, means for heating said molder, a metering cylinder communicating with said connector and into which the solidfiable liquid material is delivered from said supply means via said connector, a reciprocating piston within said metering cylinder, a two-way valve means positioned between said cylinder and said first-named end of said bore of said molder and movable in one position to admit the solidfiable liquid material from said connector into said cylinder and in a second position to permit discharge of the solidifiable liquid material within said cylinder into the first-named end of said bore, said piston being movable to provide a space in said cylinder so that in the first-named position of said valve means the solidifiable liquid material may enter said space and being movable in the second position of said valve means to extrude the solidifiable liquid material within said space into said first-named end of said mold bore, and means at the other end of said mold bore for successively cleaving the solidified product emerging therefrom into separate units.

2. An apparatus as per claim 1 including a compensating cylinder communicating with the connector, a compensating piston disposed within said cylinder, and air supply means communicating with said cylinder, the compensating cylinder, compensating piston and air supply providing surge capacity for the solidifiable liquid material when the metering cylinder is closed off from the connector by movement of said valve means into its second position and acting to force the solidifiable liquid material contained in the compensating cylinder into the metering cylinder when said valve means is moved into its first position.

3. An apparatus for providing molded units of solidified liquid product of prescribed shape comprising in combination supply means for solidifiable liquid material, a delivery connector communicating with said supply means, a straight substantially rectangular molder having a longitudinal bore of substantially uniform cross section throughout the entire length of said bore, the cross section of said bore governing the shape and texture of the desired final solidified product corresponding to that of the desired final solidified product, and adapted to receive solidifiable liquid material at one end and to discharge solidified product at its other end, means for heating said molder, a metering cylinder communicating with said connector and into which the solidifiable liquid material is delivered from said supply means via said connector, a reciprocating piston within said metering cylinder, a two-way valve means positioned between said cylinder and said first-named end of said bore of said molder and movable in one position to admit the solidifiable liquid material from said connector into said cylinder and in a second position to permit discharge of the solidifiable liquid material within said cylinder into said first-named end of said bore, said piston being movable to provide a space in said cylinder so that in the first-named position of said valve means the solidifiable liquid material may enter said space and being movable in the second position of said valve means to extrude the solidifiable liquid material within said space into said first-named end of said mold bore, means at the other end of said mold bore for successively cleaving the solidified product emerging therefrom into separate units, and means for ejecting such units from said cleaving means.

4. An apparatus for providing molded units of solidified liquid product of prescribed shape comprising in combination supply means for solidifiable liquid material, a delivery connector communicating with said supply means, a straight substantially rectangular elongated molder having a longitudinal bore of substantially uniform cross section throughout the entire length of said bore, the cross section of said bore governing the shape and texture of the desired final solidified product, and adapted to receive solidifiable liquid material at one end and to discharge solidified product at its other end, means for heating said molder, a metering cylinder communicating with said connector and into which the solidifiable liquid material is delivered from said supply means via said connector, a reciprocating piston within said metering cylinder, a two-way valve means positioned between said cylinder and said first-named end of said bore of said molder and movable in one position to admit the solidifiable liquid material from said connector into said cylinder and in a second position to permit discharge of the solidifiable liquid material within said cylinder into said first-named end of said bore, said piston being movable to provide a space in said cylinder so that in the first-named position of said valve means the solidifiable liquid material may enter said space and being movable in the second position of said valve means to extrude the solidifiable liquid material within said space into said first-named end of said mold bore, and means at the other end of said mold bore for successively cleaving the solidified product emerging therefrom into separate units.

5. An apparatus for providing molded units of solidified liquid product of prescribed shape comprising in combination supply means for solidifiable liquid material, a delivery connector communicating with said supply means, a straight substantially rectangular elongated molder having a longitudinal bore of substantially uniform cross section throughout the entire length of said bore, the cross section of said bore governing the shape and texture of the desired final solidified product, and adapted to receive solidifiable liquid material at one end and to discharge solidified product at its other end, means for heating said molder, a metering cylinder communicating with said connector and into which the solidifiable liquid material is delivered from said supply means via said connector, a reciprocating piston within said metering cylinder, a two-way valve means positioned between said cylinder and said first-named end of said bore of said molder and movable in one position to admit the solidifiable liquid material from said connector into said cylinder and in a second position to permit discharge of the solidifiable liquid material within said cylinder into said first-named end of said bore, said piston being movable to provide a space in said cylinder so that in the first-named position of said valve means the solidifiable liquid material may enter said space and being movable in the second position of said valve means to extrude the solidifiable liquid material within said space into said first-named end of said mold bore, reciprocally movable means at the other end of said mold bore for successively cleaving the solidified product emerging therefrom into separate units, and reciprocally movable pusher means for ejecting such units from said reciprocally movable cleaving means.

References Cited by the Examiner

UNITED STATES PATENTS

| | | | |
|---|---|---|---|
| 2,089,273 | 8/1937 | Lakso | 53—123 |
| 2,376,838 | 5/1945 | Walter. | |
| 2,592,793 | 4/1952 | Coon et al. | 53—123 X |
| 2,987,986 | 6/1961 | Euwe | 99—244 |

FOREIGN PATENTS

| | | |
|---|---|---|
| 1,017,361 | 9/1952 | France. |
| 1,136,952 | 1/1957 | France. |

ROBERT E. PULFREY, *Primary Examiner.*

NORTON ANSHER, JEROME SCHNALL, *Examiners.*